United States Patent
Turunc et al.

(10) Patent No.: US 10,875,942 B2
(45) Date of Patent: Dec. 29, 2020

(54) THIOL-ACRYLATE BASED FOAM PRECURSOR COMPOSITION

(71) Applicant: Greenseal NV, Deinze (BE)

(72) Inventors: Oguz Turunc, Ghent (BE); Filip Duprez, Ghent (BE)

(73) Assignee: Greenseal NV, Deinze (BE)

( * ) Notice: Subject to any disclaimer, the term of this patent is extended or adjusted under 35 U.S.C. 154(b) by 321 days.

(21) Appl. No.: 15/756,971

(22) PCT Filed: Sep. 2, 2015

(86) PCT No.: PCT/EP2015/070083
§ 371 (c)(1),
(2) Date: Mar. 1, 2018

(87) PCT Pub. No.: WO2017/036525
PCT Pub. Date: Mar. 9, 2017

(65) Prior Publication Data
US 2018/0258201 A1    Sep. 13, 2018

(51) Int. Cl.
C08F 20/38 (2006.01)
C08G 75/045 (2016.01)
(Continued)

(52) U.S. Cl.
CPC ............ C08F 20/38 (2013.01); C08G 75/045 (2013.01); C08J 9/0047 (2013.01); C08J 9/141 (2013.01); C08J 9/142 (2013.01); C08J 9/16 (2013.01); C08J 9/228 (2013.01); B65D 83/752 (2013.01); C08J 2207/04 (2013.01); C08J 2333/14 (2013.01)

(58) Field of Classification Search
CPC ...... C08F 20/38; C08G 75/045; C08J 9/0047; C08J 9/0066; C08J 9/142; C08J 9/16; C08J 9/228; C08J 2207/04; C08J 2333/00
See application file for complete search history.

(56) References Cited

U.S. PATENT DOCUMENTS 4,587,313 A    5/1986    Ohta et al.
8,652,578 B2    2/2014    Cranfill et al.
(Continued)

FOREIGN PATENT DOCUMENTS

CN    102458691    5/2012
CN    104487469    4/2015
(Continued)

OTHER PUBLICATIONS

Akmak, Emrah et al., "Preparation and characterization of boron containing thiolene photocured hybrid coatings," in Progress in Organic Coatings, vol. 75, No. 1, Mar. 7, 2012.
(Continued)

Primary Examiner — Kara B Boyle
(74) Attorney, Agent, or Firm — Levy & Grandinetti

(57) ABSTRACT

A polymeric foam precursor composition including the following components:
  (a) a di- or tri-functional (meth)acrylate oligomer (2);
  (b) a di- or higher-functional thiol compound (3); and
  (c) a borane compound (4) as initiator.
The foam precursor composition can be isocyanate free, and the curing rate is largely moisture independent and can cure at low temperatures, below freezing point.

22 Claims, 4 Drawing Sheets

(a)

(b)

(51) Int. Cl.
*C08J 9/00* (2006.01)
*C08J 9/14* (2006.01)
*C08J 9/16* (2006.01)
*C08J 9/228* (2006.01)
*B65D 83/14* (2006.01)

(56) References Cited

U.S. PATENT DOCUMENTS

| | | | |
|---|---|---|---|
| 8,835,565 B2 | 9/2014 | England et al. | |
| 2004/0157140 A1* | 8/2004 | Kamata | G03F 7/0007 430/7 |
| 2004/0176485 A1 | 9/2004 | Figovsky et al. | |
| 2009/0253819 A1 | 10/2009 | Reese et al. | |
| 2010/0178520 A1 | 7/2010 | Kneafsey et al. | |
| 2011/0236498 A1 | 9/2011 | Marteaux et al. | |
| 2014/0070973 A1 | 3/2014 | Chiu et al. | |

FOREIGN PATENT DOCUMENTS

| | | |
|---|---|---|
| DE | 10311607 | 9/2004 |
| EP | 1518874 | 3/2005 |
| EP | 1 798 255 | 6/2007 |
| EP | 2 993 200 | 3/2016 |
| GB | 865651 | 4/1961 |
| GB | 1018991 | 2/1966 |
| GB | 1111603 | 5/1968 |
| GB | 2416524 | 2/2006 |
| JP | 2000-26648 | 1/2000 |
| WO | WO 96/40528 | 12/1996 |
| WO | WO 03/066209 | 8/2003 |
| WO | WO 2005/007721 | 1/2005 |
| WO | WO 2006/083344 | 8/2006 |
| WO | WO 2010/108920 | 9/2010 |
| WO | WO 2011/003805 | 1/2011 |
| WO | WO 2014/070973 | 5/2014 |

OTHER PUBLICATIONS

Wei "Enclycopedia of Organic Chemical Materials" p. 1093 (Aug. 31, 1999).

* cited by examiner (a)

(b)

(a)

(b)

THIOL-ACRYLATE BASED FOAM PRECURSOR COMPOSITION

TECHNICAL FIELD

The present invention relates to foam precursor compositions. In particular, it concerns a foam precursor composition comprising an acrylic monomer or oligomer, a thiol component, and a borane initator. Such precursor composition can be used as 1K, 1.5K and 2K compositions stored in aerosol type pressurized cans. The precursor composition of the present invention can be entirely isocyanate free.

BACKGROUND FOR THE INVENTION

Pressurized fluids stored in containers (cans or vessels) are used in a wide field of applications. Sprayable foams are used for several industrial applications as well as by hobbyists. Foams are, among others, used in high resiliency flexible foam sealing, rigid foam insulation panels, microcellular sprayable foam seals and gaskets, durable elastomeric wheels and tyres, electrical potting compounds, Spandex fibers, carpet underlay, hard plastic parts, and the like. At present, existing sprayable foam formulations are one, one and a half, and two component foams stored in aerosol cans and/or pressure vessels.

Probably the best known and most commonly used example of sprayable foam is polyurethane (PU) foam. A PU foam formulation comprises a mixture of polyols, diisocyanates, liquefied gases as blowing agents, and several additives. Upon spraying, these froths are cured by the reaction of the isocyanate terminated prepolymers with ambient moisture.

A first issue with PU foam formulations is that curing is triggered by the moisture present in the ambient air. This means that their crosslinking rates can vary from a rainy day to a sunny day, from generally humid regions to generally dry regions, and can even be useless in particularly dry atmospheres as can be encountered in continental or (semi-)desertic climates.

A second, quite major disadvantage of PU foam compositions is that isocyanates are toxic. Methylene Diphenyl Diisocyanate (MDI) is the isocyanate most commonly used in the production of PU foams. This compound, although the least hazardous of the isocyanate groups, is still toxic, harmful by inhalation or ingestion, and also via skin contact. In addition, the compound is flammable and can also be explosive.

To solve this problem, DE10311607 proposes to react polyols with a stoechiometric excess of a monomer-free polyisocyanate and then to remove the excess di-isocyanate. Although quite effective, this solution requires an extra step for removing the excess di-isocyanate and an additional thinning agent, methyl dimethyl ether, must be added to reduce the viscosity of the mixture.

Similarly, EP1 518874 discloses a one component foam (OCF) composition having a low monomer content, which is obtained from a specific mixture of poly-(phenylene methane poly-isocyanates) (PMDI), and comprising removal of the monomeric isocyanate by distillation.

US2009253819 discloses an OCF composition having a low content of monomeric MDI obtained by reacting a specific mixture of MDI and polymeric MDI having an average functionality of from 2.2 to 5.2. But the preparation of the specific mixture requires the extraction of mixtures of diisocyanates and polyisocyanates having an average functionality of greater than 2 and then freeing them from diisocyanates by distillation, which basically does not remove, but simply shifts the distillation step upstream of the process, compared with the previous disclosures.

WO2005/007721 discloses an OCF composition having a low content of free MDI, obtained by the use of mixtures of NCO-terminated prepolymers obtained by reaction of polyols and diphenylmethane diisocyanate in stoechiometric excess which had been freed from monomers, and a number of polymeric MDI and diluents. Disadvantageous here are the extremely high viscosities of the starting materials in the absence of diluting monomeric MDI.

In an attempt to make without any isocyanates, the use of Alpha Silane terminated PU prepolymers (STP's) has been proposed. A well-known example is Soudafoam SMX(R) which is an isocyanate-free fixing foam. Another example of the incorporation of silane to avoid the toxic effect of isocyanate is presented in jP2000026648 which discloses a composition containing (i) an organic compound having a C=C double bond, (ii) a compound having an SiH group and (iii) a blowing agent and/or a compound having an OH group. Although isocyanate-free, the use of PU foams based on Alpha Silane terminated PU prepolymers in aerosol cans has several drawbacks, such as high viscosity, slow curing, some crack formation and a rather high cost.

EP1798255 discloses a process for preparing precursor mixtures of polymer foam to be packed in pressurized vessels and or aerosol cans. The polymer foam can be either a polyester foam, a foam based on cyclocarbonate oligomers and primary amine oligomers, or a foam based on acrylic oligomers. Biodiesel is included as latent hardener and/or extender and/or liquid filler in polyurethane formulations, more particularly One Component Foams precursor mixtures. The improved formulation avoids long-term deterioration of flexibility and mechanical strength of the foam.

US2004176485 discloses a photo-polymerizable acrylic foam precursor composition for use in variety of indoor or outdoor sealing applications. Said composition comprises at least two acrylic-based reactionable oligomers, one difunctional and the other at least trifunctional, and at least a first and a second radical producing photoinitiators.

WO2010108920 discloses a pressurized can containing a polymer foam composition for use in one component and two component foams, said polymer foam composition comprising an unsaturated resin and an oligomeric acrylic resin. Peroxide initiators are proposed like benzoyl peroxide, methyl ethyl ketone peroxide, Cumene peroxide and Lauryl peroxide.

WO9640528 discloses thiol-containing photosensitive polymeric compositions and foam compositions that are formed by mechanically frothing the polymeric composition and curing the resulting froth with radiation to yield a foam composition. To trigger the crosslinking reaction the composition comprises a photoinitiator and/or a photosensitizer.

GB865651 discloses a polar vinyl monomer polymerized in the presence of a two-component catalyst system consisting of (a) an organo-boron compound having at least one direct carbon to boron linkage and (b) a hydroperoxide, including hydrogen peroxide. GB1018991 discloses a coating composition comprising methyl methacrylate monomer, triethylborane and a trace of iodine which can be formed into an aerosol spray with dichlorodifluoromethane. US2010178520 discloses (meth)acrylate-based polymerizable compositions and adhesive systems prepared therefrom, which include a alkylated borohydride or tetraalkyl borane metal or ammonium salt and a polymerizable siloxane. These compositions and adhesive systems are particularly well suited for bonding applications which involve at least one low energy bonding surface, for example, the polyolefins, polyethylene, and polypropylene. GB1111603 discloses reinforced polymeric compositions comprising an alkyl methacrylate polymer and an inorganic reinforcing agent. The polymerization of the alkyl methacrylate polymer in presence of the reinforcing agent is initiated by means of a free-radical catalyst, preferably a peroxy compound; an activator may also be used, e.g. a boron hydride or borane (optionally complexed with various basic compounds, such as amines or triphenylphosphine, or with tetrahydrofuran) or a redox reducing component It is a main object of the present invention to provide a foam precursor composition which can be used in 1K as well as in 1.5 K aerosol can systems for forming a foam. The curing of the foam composition is not dependent on ambient moisture and proceed even at low temperatures, below 0° C. By using (meth)acrylate oligomers, the foam precursor compositions of the present invention may comprise no isocyanate.

These and other advantages of the present invention are described in continuation.

SUMMARY OF THE INVENTION

The present invention is defined in the appended independent claims. Preferred embodiments are defined in the dependent claims. In particular, the present invention concerns a polymeric foam precursor composition comprising the following components:

(a) A di- or tri-functional (meth)acrylate oligomer;
(b) a di- or higher-functional thiol compound, and
(c) a borane compound as initiator.

In a preferred embodiment, the (meth)acrylate oligomer is a polyester (meth)acrylate or a polyurethane acrylate, or mixture of both. The thiol compound preferably has the structure $R(SH)_n$, with $n \geq 2$, preferably $n=3$ or 4, and is preferably pentaerythritol tetrakis(3-mercaptopropionate) (TKT). The composition preferably comprises no isocyanates.

The borane compound can be an alkyl- or alkoxy-borane of formula $(alkoxy)_{(3-n)}$-B-$(alkyl)_n$, with $n=0$ to 3, and wherein alkyl and alkoxy each independently comprise between 1 and 14 C, more preferably the borane is selected among the group of trimethylborane, triethylborane, tripropylborane, tributylborane, trihexylborane, trioctylborane, tridecylborane, tri tridecylborane, most preferably, the borane compound is selected among triethylborane, methoxydiethylborane, and tributylborane.

In a preferred embodiment, the composition further comprises one or more of the following components:

(d) A phenolic and/or phosphonic acid compound as stabilizer,
(e) A flame retardant, preferably TCPP;
(f) A surfactant, such as a silicone surfactant,
(g) A propellant such as LPG and/or dimethyl ether (DME).
(h) A diluent such as monoethylene glycol (MEG) for a half component.

The di- or tri-functional (meth)acrylate oligomer and di- or higher-functional thiol compound are preferably in the form of a stabilized thiol acrylate blend, further comprising a phenolic or phosphonic acid compound as stabilizer.

The composition is preferably stored in an aerosol can. To this effect, at least the di- or tri-functional (meth)acrylate oligomer and di- or higher-functional thiol compound should be stored in an aerosol can, with at least the borane compound being physically separated from the former two components. The aerosol can should also contain a propellant. In a 1.5K system, the borane compound, optionally a diluent compound, such as monoethylene glycol (MEG), is stored in a separate compartment as half-component, and the di- or tri-functional (meth)acrylate oligomer and di- or higher-functional thiol compound is stored outside said compartment. The borane initiator is brought into contact with the di- or tri-functional (meth)acrylate oligomer and di- or higher-functional thiol compound upon spraying the composition out of the can through an aerosol nozzle.

In a 1K foam system the borane compound is microencapsulated such that the microcapsules are dispersed in a solution or suspension comprising the di- or tri-functional (meth)acrylate oligomer and di- or higher-functional thiol compound. The microcapsules are opened by bursting and/or tearing upon spraying the composition out of the can through an aerosol nozzle, so that the borane contacts the thiol acrylate blend.

It is preferred that the molar ratio of the total mercaptan units of the thiol compound to the total (meth)acrylic units of acrylate oligomer is comprised between 50 and 150%, preferably between 90 and 110%, more preferably between 95 and 100%. The borane initiator is preferably present in an amount comprised between 0.5 and 10 wt. %, with respect to the total weight of thiol compound and acrylate oligomer, preferably between 1 and 6 wt. %.

The present application also concerns the use of a bi- or higher-functional thiol compound and of a borane compound for curing a di- or tri-functional (meth)acrylate oligomer into a foam.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

The cross-linking system proposed in the present invention as an alternative route to isocyanate-moisture curing is metal free click chemistry, in particular, it is thiol-X chemistry. The present invention concers a thiol-acrylate reaction system, defined by an acrylate oligomer (di- or tri-functional) to be cured with a di- or higher-functional thiol compound with the aid of an initiator. In particular, the polymeric foam precursor composition of the present invention comprises at least the following components:

(a) A di- or tri-functional (meth)acrylate oligomer (2);
(b) A di- or higher-functional thiol compound (3); and
(c) A borane compound (4) as initiator.

The di- or tri-functional (meth)acrylate oligomer (2) can be a polyester (meth)acrylate or a polyurethane acrylate, or a mixture of both. For example, the (meth)acrylate oligomer can be produced by reacting maleic acid with a fatty acid diol yielding a fatty dimer polyol suitable as (meth)acrylate oligomer for the present invention. Bisphenol A based acrylate oligomers may be used instead or in combination with the foregoing oligomers, such as CN104A75, CN104A60, SR349, CN9167, CN970A60, or CN1963 available from Sartomer, or Bisphenol A glycerolate (1 glycerol/phenol) diacrylate from Sigma-Aldrich (CAS: 4687-94-9).

The di- or higher-functional thiol compound (3), preferably has the structure $R(SH)_n$, with n≥2, preferably n=3 or 4. For example the following thiol compounds are suitable for the present invention:

Pentaerythritol tetrakis(3-mercaptopropionate) (TKT),
trimethylolpropane tris (3-mercaptopropionate) (CAS: 33007-83-9),
Tris[2-(3-mercaptopropionyloxy)ethyl] isocyanurate (CAS: 36196-44-8),
Pentaerythritol tetrakis(2-mercaptoacetate) (CAS: 10193-99-4).

Figure 4:
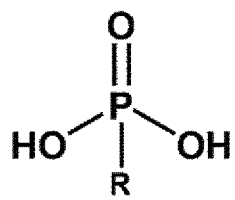
FIG. 4: Shows various stabilizers, (a) phosphonic acid, and (b) phenolic compounds.
Figure 4:
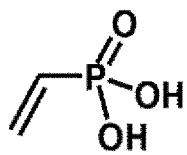
Figure 4:
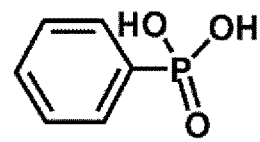
Figure 4:
Figure 4:
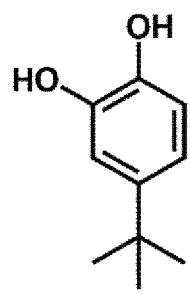
Figure 4:
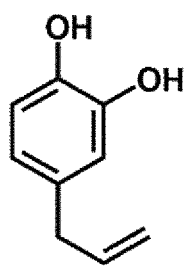
Figure 4:
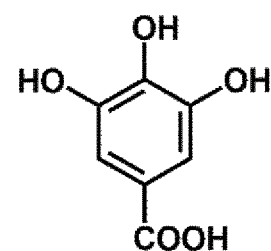
Figure 4:
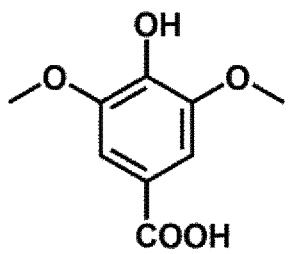
Figure 4:
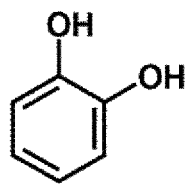
Figure 4:
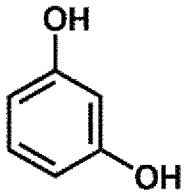
Figure 4:
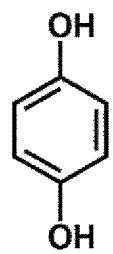
Figure 4:
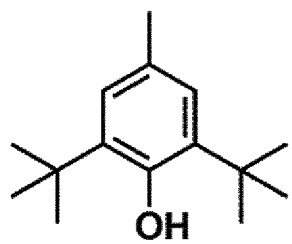

The di- or tri-functional (meth)acrylate oligomer (2) and di- or higher-functional thiol compound (3) are preferably pre-blended together with a stabilizer (5) to obtain a stabilized thiol-acrylate blend (3a), which is easier to handle than the two components separately. Best stabilized blends were obtained by using a phenolic and/or phosphonic acid compound as stabilizer. For example, pyrogallol, vinylphosphonic acid, phenylphosphonic acid, phosphorous acid (CAS: 13598-36-2), (12-phosphonododecyl)phosphonic acid (CAS: 7450-59-1), (3-Bromopropyl)phosphonic acid (CAS: 1190-09-6), ethyl/buthyl phosphonic acid silica (no CAS nr. Sigma-Aldrich product nr:744794) can be successfully used to stabilize the thiol-acrylate blend (3a). FIG. 4 illustrates examples of stabilizers, (a) phoshonic acid wherein R can be H, alkyl (preferably 2-9 C-alkyl), vinyl, or aromatic, and (b) phenolic stabilizers.

Figure 5:
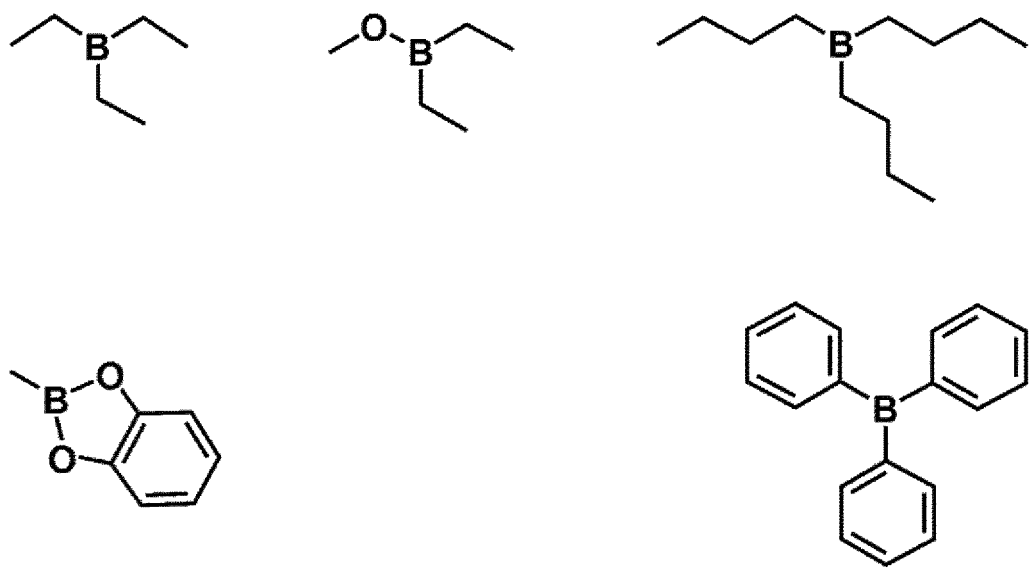
FIG. 5: Shows various boranes suitable as initiator according to the present invention.
Figure 6:
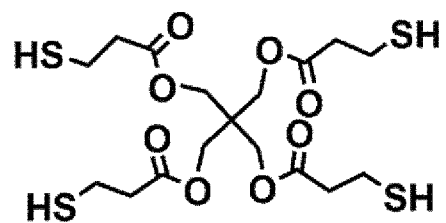
FIG. 6: Shows the formula of a preferred thiol compound: TKT.

Because many applications of such foams are in cavities, sheltered from any light, photo-initiators as proposed in the prior art were discarded as not satisfactory. Various initiators were tested, including peroxides and toluidines. After an extensive screening it was finally found out that best results were obtained with a borane compound as initiator. For example, the borane compound (4) can be an alkyl- or alkoxy-borane of formula $(alkoxy)_{3-n}$-B-$(alkyl)_n$, with n=0 to 3, and wherein alkyl and alkoxy each independently comprise between 1 and 14 C. In particular the borane compound may be selected among the group of trimethylborane, triethylborane, tripropylborane, tributylborane, trihexylborane, trioctylborane, tridecylborane, tri tridecylborane. Triethylborane, methoxydiethylborane, and tributylborane are preferred borane compounds. Examples of boranes suitable for the present invention are illustrated in FIG. 5.

One of the major advantages of the present invention is that stable foams capable of curing in less than 3 h, even in less than 1 h, regardless of the relative humidity, can be obtained with no isocyanate groups at all. In view of the high toxicity of isocyanate groups, this is highly advantageous.

The polymeric foam precursor composition of the present invention may further comprise one or more of the following components:

A flame retardant (6), preferably tris(2-chloroisopropyl) phosphate (TCPP);

A surfactant (7), such as a non-ionic surfactant, preferably a silicone surfactant, such as Tegostab® available from Evonik Industries or Vorasurf available from Dow Chemicals.

A propellant (8) such as LPG and/or dimethyl ether (DME).

A diluent (9) for the borane compound initiator (4), such as monoethylene glycol (MEG), for the half component (10) in a 1.5K system as will be discussed below.

The acrylate compound (2) and thiol compound (3), preferably in the form of a stabilized thiol-acrylate blend (3a) must be physically separated from the borane initiator (4) until curing is desired. This can be achieved by storing them in two separate containers thus forming a 2K system. 2K systems are, however, cumbersome to use and 1K or 1.5K are preferred, in particular if stored in an aerosol can with a propellant (8) for spraying.

Figure 1:
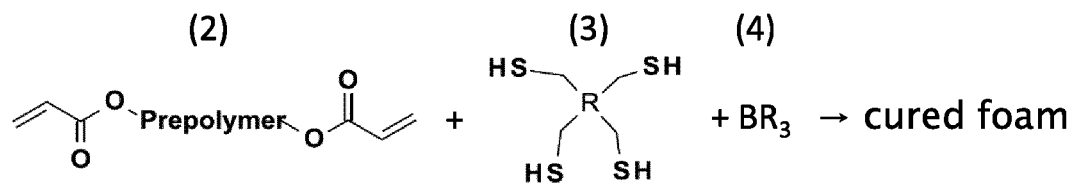
FIG. 1: shows two embodiments of curing reaction of a foam according to the present invention.
Figure 1:
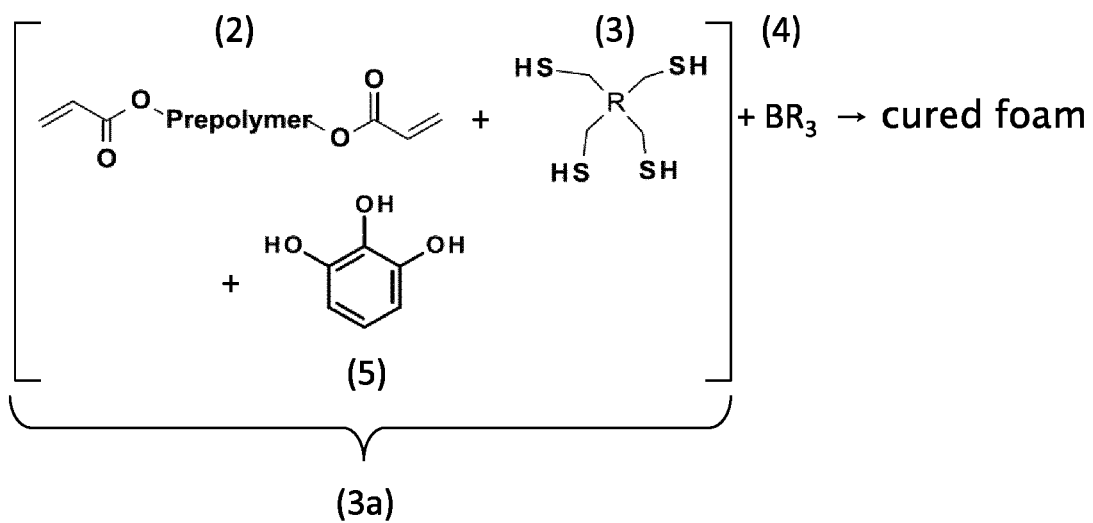
Figure 2:
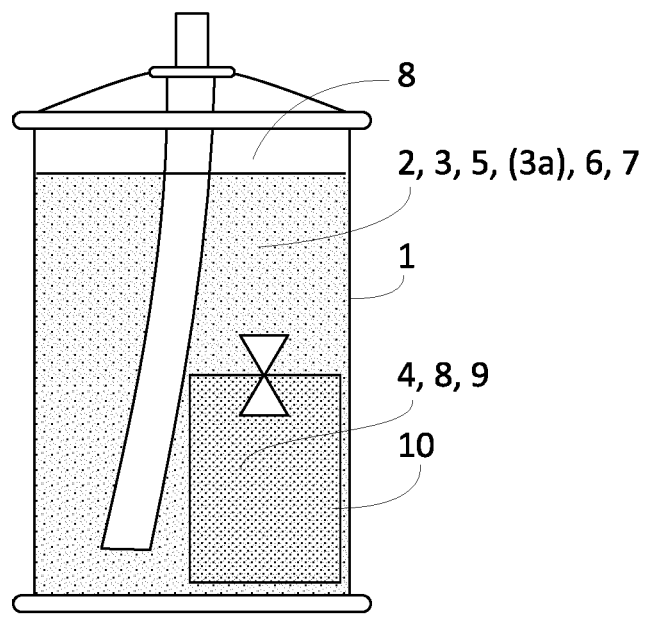
FIG. 2: Shows a 1.5K foam system stored in an aerosol can.
Figure 3:
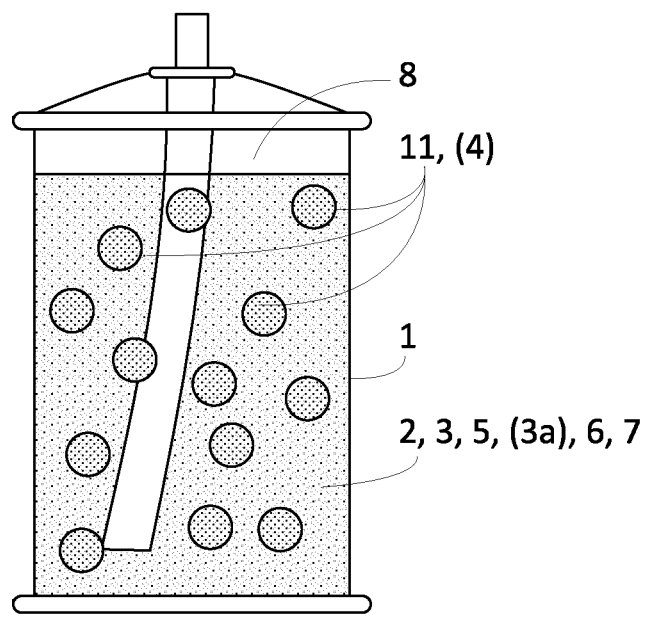
FIG. 3: Shows a 1K foam system stored in an aerosol can, with microencapsulated borane initiator.

In a 1.5K foam systems the borane initiator (4) is added to the (stabilized) thiol-acrylate blend (2, 3, 3a) shortly or immediately before the composition is dispensed from its container. As illustrated in FIG. 2 the (stabilized) thiol-acrylate blend (2, 3, 3a) is preferably stored in a pressurized aerosol can (1) which further contains a second, smaller pressurized container containing the half component (10) comprising a borane initiator (4) and, if necessary, a diluent (9) such as monoethylene glycol (MEG)). Any other additives such as flame retardants (6) or surfactants (7) may be contained either in the aerosol can or in the second, smaller container. It is generally preferred to store such additives in the main aerosol can. Pressurization of the aerosol can (1) and smaller container requires a propellant (8). Upon actuating the aerosol nozzle of the aerosol can, the half component (10) is released from the second container into the (stabilized) thiol-acrylate blend (2, 3, 3a), simultaneously or shortly before the foam forming composition is to be dispensed and applied. It is clear that once the aerosol nozzle is actuated, the aerosol can must be emptied and cannot be re-used at a later stage, since any composition remaining in the can will cure in the can.

In this respect, 1K foam systems are advantageous since a 1K system can be dispensed from an aerosol can in several shots separated in time. This can be achieved by microencapsulating the borane initiator (4) in microcapsules (11) dispersed in the (stabilized) thiol-acrylate blend (2, 3, 3a). The microcapsules must open upon spraying the composition through the nozzle in order to mix the borane initiator (4) with the (stabilized) thiol-acrylate blend (2, 3, 3a). This can be achieved either by blowing the microcapsule by the pressure difference between the inside of the microcapsules and the atmosphere or by shearing the microcapsules as they pass through the aerosol nozzle to tear them open. Examples of microcapsules which can be used to this purpose are described, e.g., in WO2011003805, US2011/0236498, GB2416524, and WO03/066209. The microencapsulated borane initiator (4, 11) generally does not require any diluent (9) as each particle comprises a small volume of initiator.

The amount of thiol compound (3) relative to the amount of acrylate oligomer (2) depends on the basis of the number of mercaptan units with respect to the number of (meth)acrylate units and therefore depends on the respective functionalities of the thiol and acrylate compounds. In particular, it is preferred that the molar ratio of the total mercaptan units of the thiol compound (3) to the total (meth)acrylic units of the acryliate oligomer (2) be comprised between 50 and 150%, preferably between 90 and 110%, more preferably between 95 and 100%.

For a composition comprising 100 parts of both thiol compound (3) and acrylate oligomer (2) together, the borane initiator (4) is preferably present in an amount comprised between 0.5 and 10 parts, preferably between 1 and 6 parts, more preferably between 3.5 and 4.5 parts.

For 100 parts of both thiol compound (3) and acrylate oligomer (2) together, the composition of the present invention may comprise between 1 and 20 parts, preferably 5 and 15 parts of a flame retardant (6) such as tris(2-chloroisopropyl) phosphate (TCPP). It may comprise between 1 and 10 parts, preferably between 2 and 5 parts of a surfactant such as Tegostab© B8871, B84503, B8513, B8517, available from Evonik Industries or Vorasurf 504 available from Dow Chemicals, and between 30 and 60 parts, preferably between 35 and 50 parts of a propellant (8), such as LPG and/or DME, the latter acting also as solvent for the (stabilized) thiol-acrylate blend (2, 3, 3a). In case a stabilized thiol-acrylate blend (2, 3, 3a) is formed, it can be stabilized by adding 10 to 20 parts of a stabilizer (6) such as phenolic and/or phosphonic acid to a 100 parts of both thiol compound (3) and acrylate oligomer (2) together. For 1.5K foam systems, it is important that the viscosity of the half component (10)—mainly the borane initiator (4)—be sufficiently low to ensure a homogeneous mix thereof with the main component—mainly the thiol-acrylate blend-. The viscosity of the half-component (10) can be controlled with a non reactive diluent (9), such as monoethylene glycol (MEG). The weight ratio diluent (9) to borane (4) can be comprised between 0.5 and 5, preferably between 1 and 3.

Table 1 lists an example of 1.5K foam composition according to the present invention.

TABLE 1

| Typical 1.5K aerosol foam formulation | | | | |
|---|---|---|---|---|
| element | component | description | wt. % | parts |
| Main component | thiol-acrylate blend (2)&(3) | TKT + bisphenol A based acrylate | 59% | 100.0 |
| | Surfactant (7) | B8871 (from Evonik) | 2% | 3.3 |
| | stabilizer (5) | phosphonic ac. + pyrogallol | 8% | 14.0 |
| Half component (10) | borane initiator (4) | TEB | 2% | 3.9 |
| | Non-reactive diluent (9) | MEG | 5% | 8.5 |
| Propellant (8) | Propellant (8) | LPG | 16% | 27.5 |
| | Propellant/ Solvent (8) | DME | 7% | 11.8 |
| | | | 100% | 168.9 |

The rigidity and other mechanical properties of the foam can be controlled by an adequate choice of the components. For examples, softer foams can be obtained with ester acrylates and harder foams with urethane acrylates, since the latter form a more rigid backbone than the former.

Unlike isocyanates which are activated by moisture, borane initators are activated with oxygen in the atmosphere. This has the great advantage that the curing kinetics of the foam is not dependent on the weather and climate of the place of application and is constant regardless of the moisture content of the atmosphere. Another great advantage is that the foam can cure also at temperatures below freezing point.

| REF | Description |
|---|---|
| 1 | aerosol can |
| 2 | di- or tri-functional (meth)acrylate oligomer |
| 3 | di- or higher-functional thiol compound |
| 3a | stabilized thiol-acrylate blend |
| 4 | borane compound (initiator) |
| 5 | phenolic or phosphonic acid compound (stabilizer) |
| 6 | flame retardant (e.g., TCPP) |
| 7 | surfactant (e.g., silicone surfactant) |
| 8 | propellant (e.g., LPG and/or-dimethyl etherb (DME).) |
| 9 | diluent for the half component (e.g., monoethylene glycol (MEG)) |
| 10 | half component |
| 11 | microcapsules |

The invention claimed is:

1. A polymeric foam precursor composition comprising the following components:
   (a) A di- or tri-functional (meth)acrylate oligomer;
   (b) a di- or higher-functional thiol compound; and
   (c) a borane compound as initiator.

2. The composition according to claim 1, wherein the thiol compound has the structure $R(SH)_n$, with $n \geq 2$.

3. The composition according to claim 1, wherein the thiol compound is Pentaerythritol tetrakis(3-mercaptopropionate) (TKT), trimethylolpropane tris (3-mercaptopropionate), tri [2-(3-mercaptoproprionyloxy)ethyl] isocyanurate or pentaerythritol tetrakis(2-mercaptoacetate).

4. The composition according to claim 1, wherein the borane compound is an alkyl- or alkoxy-borane of formula $(alkoxy)_{3-n}$-B-$(alkyl)_n$, with n=0 to 3, and wherein alkyl and alkoxy each independently comprise between 1 and 14 C.

5. The composition according to claim 1, comprising no isocyanate group.

6. The composition according to claim 1, further comprising one or more of:
   (d) A phenolic and/or phosphonic acid compound as stabilizer;
   (e) A flame retardant;
   (f) A surfactant;
   (g) A propellant; and
   (h) A diluent.

7. The composition according to claim 6, wherein components (a)&(b) (=di- or tri-functional (meth)acrylate oligomer and di- or higher-functional thiol compound) are in the form of a stabilized thiol acrylate blend, further comprising component (d) (=phenolic or phosphonic acid compound) as stabilizer.

8. The composition according to claim 6, wherein at least components (a) to (c) and (g) are stored in an aerosol can, with at least component (c) (=borane compound) being physically separated from components (a)&(b) (=di- or tri-functional (meth)acrylate oligomer and di- or higher-functional thiol compound).

9. The composition according to claim 8, wherein component (c) (=borane compound) is microencapsulated such that the microcapsules are open by bursting and/or tearing upon spraying the composition out of the can through an aerosol nozzle.

10. The composition according to claim 8, wherein components (c)&(h) (=borane compound and diluent) are stored in a separate compartment as half-component, and wherein components (a)&(b) (=di- or tri-functional (meth)acrylate oligomer and di- or higher-functional thiol compound) are stored outside said compartment, and wherein component (c) contacts components (a)&(b) upon spraying the composition out of the can through an aerosol nozzle.

11. The composition according to claim 1, wherein the molar ratio of the total mercaptan units of component (b) (=thiol compound) to the total meth)acrylate units of component (a) (=(meth)acrylate oligomer) is comprised between 50 and 150%.

12. The composition according to claim 1, wherein the borane is present in an amount comprised between 0.5 and 10 wt. %, with respect to the total weight of components (a)&(b).

13. The composition according to claim 2, wherein the thiol compound has the structure $R(SH)_n$, with n=3 or 4.

14. The composition according to claim 13, wherein the borane compound is an alkyl- or alkoxy-borane of formula $(alkoxy)_{3-n}$-B-$(alkyl)_n$, with n=0 to 3, and wherein alkyl and alkoxy each independently comprise between 1 and 14 C.

15. The composition according to claim 14, comprising no isocyanate group.

16. The composition according to claim 15, further comprising one or more of:
(d) A phenolic and/or phosphonic acid compound as stabilizer;
(e) A flame retardant;
(f) A surfactant;

(g) A propellant; and (h) A diluent.

17. The composition according to claim 16, wherein components (a)&(b) (=di- or tri-functional (meth)acrylate oligomer and di- or higher-functional thiol compound) are in the form of a stabilized thiol acrylate blend, further comprising component (d) (=phenolic or phosphonic acid compound) as stabilizer.

18. The composition according to claim 17, wherein at least components (a) to (c) and (g) are stored in an aerosol can, with at least component (c) (=borane compound) being physically separated from components (a)&(b) (=di- or tri-functional (meth)acrylate oligomer and di- or higher-functional thiol compound).

19. The composition according to claim 18, wherein component (c) (=borane compound) is microencapsulated such that the microcapsules are open by bursting and/or tearing upon spraying the composition out of the can through an aerosol nozzle.

20. The composition according to claim 1, wherein the (meth)acrylate oligomer is a polyester (meth)acrylate, a polyurethane acrylate, a bisphenol A based acrylate, or a mixture thereof.

21. The composition according to claim 4, wherein the borane is selected among the group of trimethylborane, triethylborane, tripropylborane, tributylborane, trihexylborane, trioctylborane, tridecylborane, tridecylborane, and methoxydiethylborane.

22. The composition according to claim 6, wherein the flame retardant is TCPP, the surfactant is a silicone surfactant, the propellant is LPG and/or dimethyl ether (DME) and/or the diluent is monoethylene glycol (MEG).

* * * * *